(12) United States Patent
Slifer

(10) Patent No.: US 6,342,010 B1
(45) Date of Patent: Jan. 29, 2002

(54) PERSONALIZED WIRELESS VIDEO GAME SYSTEM

(76) Inventor: Russell Dale Slifer, 5324 Drew Ave. S., Minneapolis, MN (US) 55410

( * ) Notice: Subject to any disclaimer, the term of this patent is extended or adjusted under 35 U.S.C. 154(b) by 0 days.

(21) Appl. No.: 08/970,258

(22) Filed: Nov. 14, 1997

(51) Int. Cl.[7] .......................... A63F 13/02; A63F 13/10
(52) U.S. Cl. ........................... 463/39; 434/351; 463/29
(58) Field of Search .............................. 463/39, 29, 40, 463/41, 42, 43, 44, 35, 36, 37, 38; 341/20; 345/168, 172, 156; 434/322, 325, 351; 380/7; 320/107; 273/148 B

(56) References Cited

U.S. PATENT DOCUMENTS

| | | | | |
|---|---|---|---|---|
| 5,273,437 A | * | 12/1993 | Caldwell et al. | 434/351 |
| 5,618,045 A | * | 4/1997 | Kagan et al. | 463/40 |
| 5,634,849 A | * | 6/1997 | Abecassis | 463/30 |
| 5,738,583 A | * | 4/1998 | Comas et al. | 463/40 |
| 5,759,100 A | * | 6/1998 | Nakanishi | 463/37 |
| 5,806,849 A | * | 9/1998 | Rutkowski | 463/38 |
| 5,823,788 A | * | 10/1998 | Lemelson et al. | 434/351 |
| 5,838,138 A | * | 11/1998 | Henty | 320/107 |
| 5,860,023 A | * | 1/1999 | Tognazzini | 434/351 |

* cited by examiner

*Primary Examiner*—Jessica J. Harrison
(74) *Attorney, Agent, or Firm*—Fogg, Slifer & Polglaze, P.A.

(57) ABSTRACT

A video game system is described which includes a wireless game controller which stores information about the user of the controller. The controller includes a memory for storing the information. The information is communicated through wireless transmissions to a processor which can operate a video game. The personalized information can include, for example, the user's name, skill level, preferred characters, handicaps, limitations, and/or historical game scores. The game controllers can include a wireless receiver for receiving communications from the processor to update information stored in the controller. Several different communication operations and protocols are described, including storing a user identification code in the controller with corresponding detailed information stored in the processor, or storing detailed information in the hand held controller and down loading the information to the processor.

19 Claims, 3 Drawing Sheets

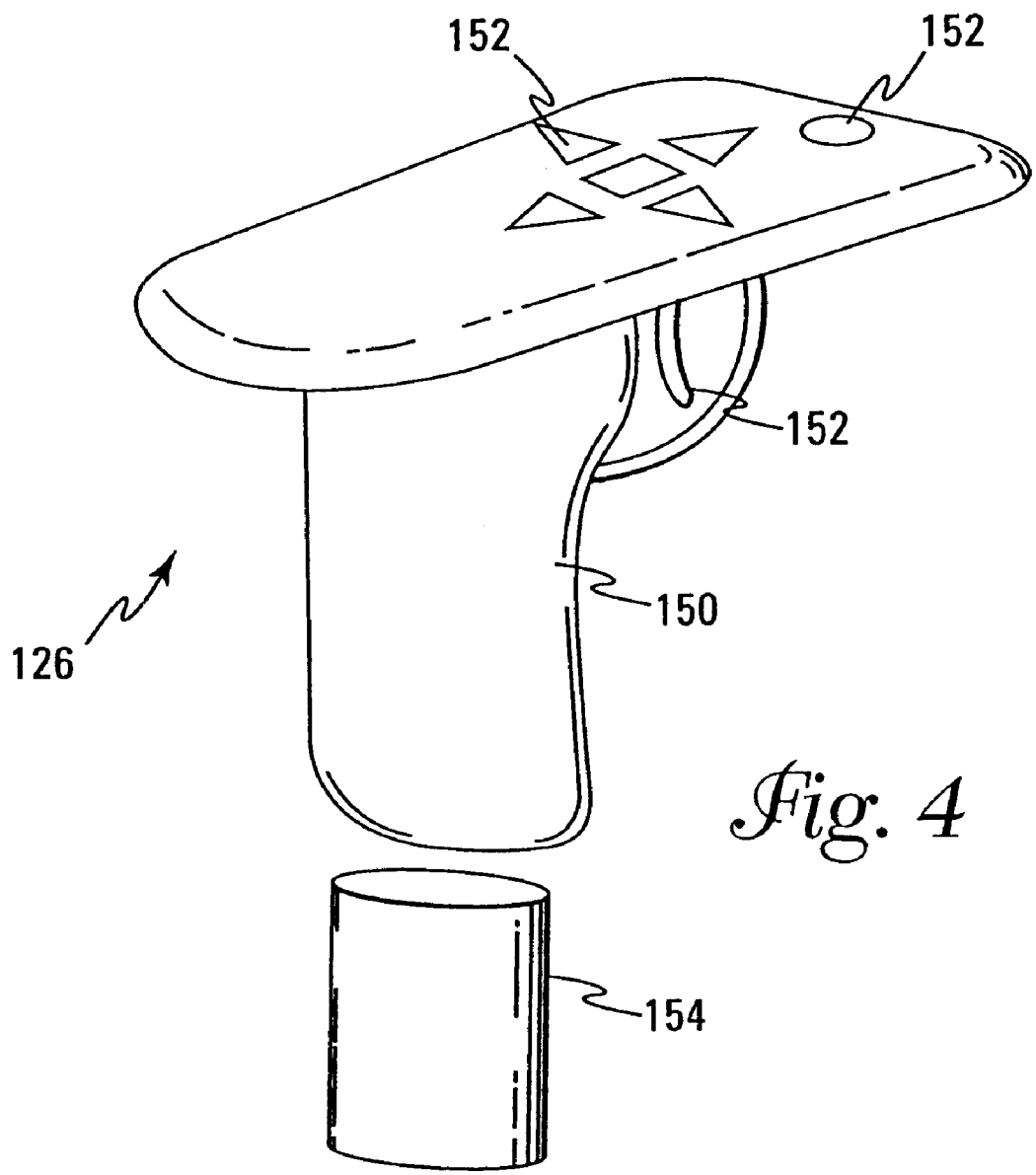

PERSONALIZED WIRELESS VIDEO GAME SYSTEM

TECHNICAL FIELD OF THE INVENTION

The present invention relates to video games and in particular the present invention relates to wireless control of a video game system.

BACKGROUND OF THE INVENTION

With the advancements in video game systems, personalized operation is becoming more desirable. Original video games allowed any user to operate the game at different skill levels which were selected at the start of the game. Each user, however, was treated the same during operation of the game. It would be desirable to allow each user to have a personality which interacts with the game, such that video game have the ability to "recognize" a user and adjust game operation accordingly.

Video game systems typically include one or more controllers for controlling the operation of a video game. These controllers are connected to a central processing unit through a communication bus cable. The video game user, therefore, is restricted in possible operating locations. That is, a user cannot play a game from a relatively remote location.

Further, because the game controllers are attached to the central processing unit, a portable personalized controller cannot be provided. Any user who operates a game using the same controller is treated the same by the video game.

For the reasons stated above, and for other reasons stated below which will become apparent to those skilled in the art upon reading and understanding the present specification, there is a need in the art for a video game system having a portable controller which allows user to operate a video game from a remote location. Further, a video game system is need which has portable personalized game controllers.

SUMMARY OF THE INVENTION

The above mentioned problems with video game systems and other problems are addressed by the present invention and which will be understood by reading and studying the following specification. A video game system is described which includes personalized wireless game controllers. The controller allows for the custom operation of an interactive video system based upon personal data transmitted from the controller.

In particular, one embodiment of the present invention describes a personalized portable video game controller comprising a wireless transmitter for transmitting user personalized information and video game control signals to a video game processor, input controls for generating the control signals in response to movements by a user, a non-volatile memory for storing the user personalized information, and a receiver for receiving wireless transmissions from the video game processor. The received wireless transmissions including data to be stored in the non-volatile memory.

In another embodiment, a video game system is described which comprises a processor unit for operating game software and displaying video images on a display screen. The processor includes a receiver for receiving wireless identification and control signal transmissions. The system also comprises a personalized portable controller having a plurality of control switches for generating game control signals, a non-volatile memory for storing personalized identification information corresponding to a user of the controller, and a transmitter for wireless transmitting of the identification and control signals to the processor unit.

In another embodiment, a method of operating an interactive video system is described. The method comprises the steps of activating a processing unit, transmitting personalized information from a controller using wireless transmissions, storing the personalized information in a memory of the processing unit, transmitting updated personalized information from the processing unit to the controller using wireless transmissions, and storing the updated personalized information in a memory of the controller.

BRIEF DESCRIPTION OF THE DRAWINGS

FIG. 4 is a detailed illustration of one embodiment of a wireless video game controller.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Figure 1:
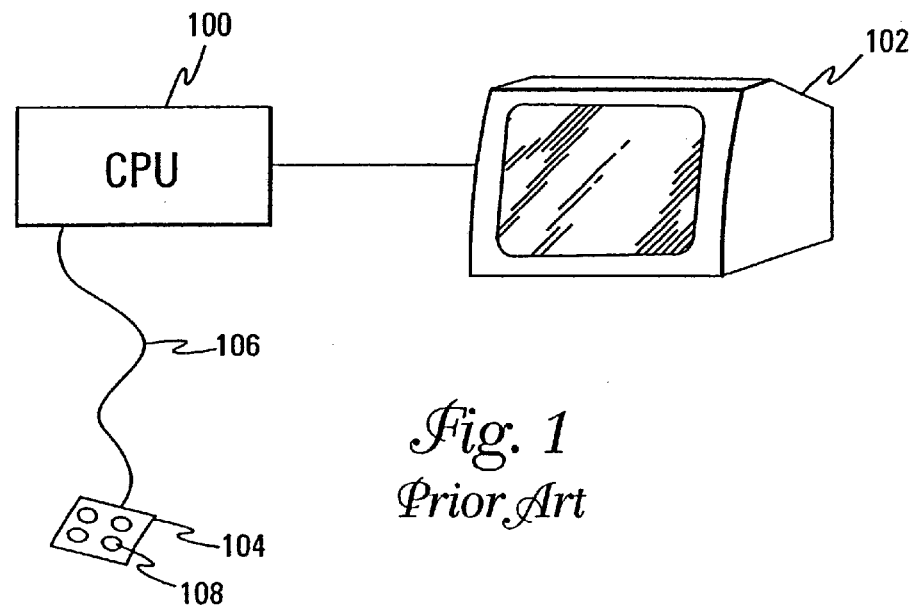
FIG. 1 is a prior art video game system.

Referring to FIG. 1 a typical video game system is described. The system includes a central processing, unit 100 which is connected to a video monitor 102, or television. The central processing unit is adapted to receive a video game cartridge which includes software to operate the central processing unit. A game controller 104 provides control signals to the central processing unit via control wires 106, or communication bus. The controller can include a number of input switches 108 for providing signals to operate a video game. A variety of controllers are known to those skilled in the art, but all controllers require wires and are not personalized. It should be noted that the term video game, as used herein, refers to interactive video systems displaying images for amusement or education. Video game, therefore, should not be interpreted as limited to amusement systems.

Figure 2:
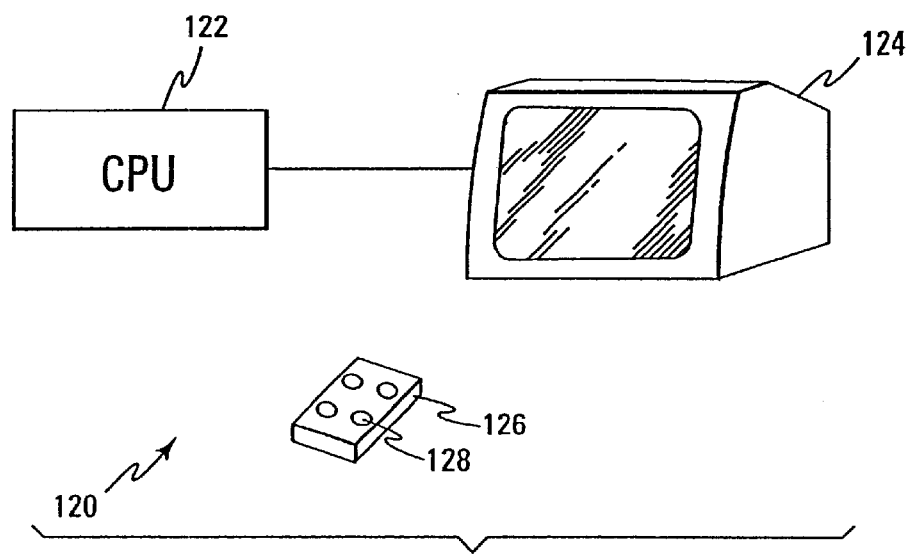
FIG. 2 is a video game system of the present invention.

FIG. 2 illustrates a video game system 120 which includes a central processing unit 122 which is connected to a video screen 124, monitor, or television. The central processing unit is adapted to receive a video game cartridge which includes software to operate the central processing unit. The software can equally be supplied on any storage medium, such as magnetic diskette or compact disk, or the like. A wireless game controller 126 provides control signals to the central processing unit. The controller can include a number of inputs 128, or switches for providing signals to operate a video game. Again, a controller of the present invention can include any known input device including electrical switches sensitive to human movements.

Figure 3A:
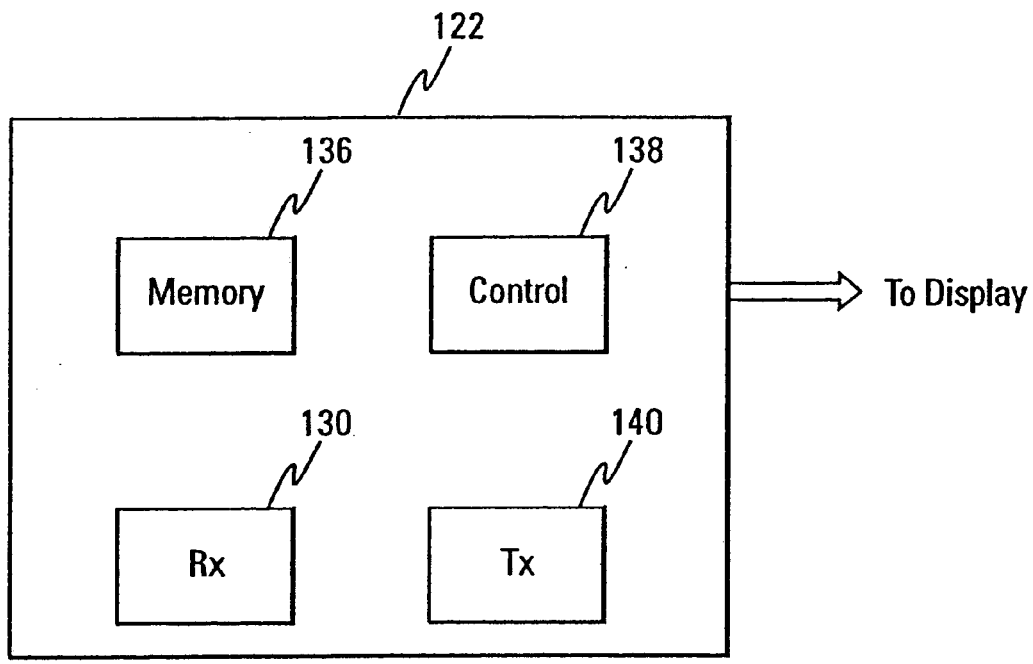
FIGS. 3a and 3b are a more detailed illustrations of some of the components of the system of FIG. 2.
Figure 3B:
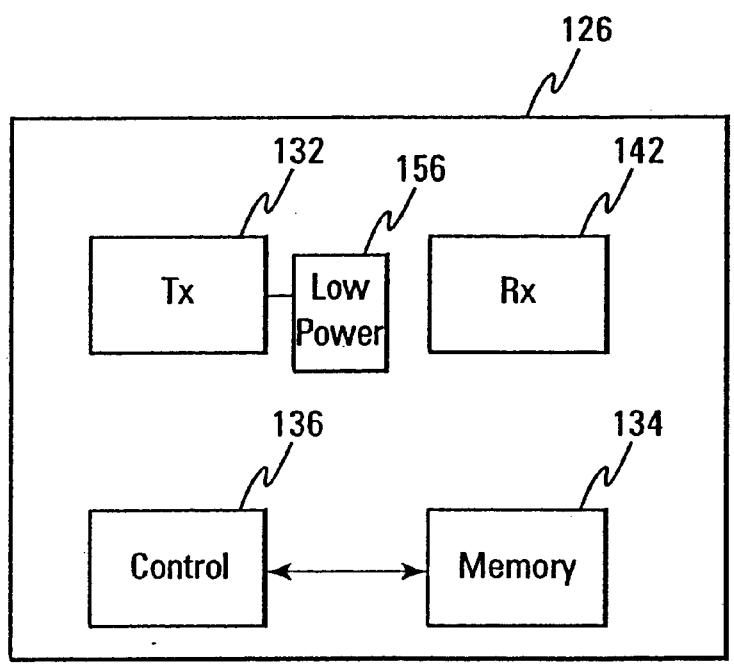

A more detailed description of the features of the components of the video game system are described as follows. The central processing unit includes at least one receiver circuit (RX) 130 for receiving signals from the wireless controller 126, see FIGS. 3a and 3b. In the preferred embodiment, the receiver 130 is adapted to receive signals provided in a predetermined frequency range. The controller 126 includes a transmitter circuit 132 designed to transmit control signals within this frequency range. The wireless controller, therefore, provides a game user the freedom to operate a video game from a greater distance than prior video game systems. That is, video games can be played on large video screens without the requirement of operating the games from close proximity without requiring long controller cables. Each controller includes a unique transmitter, thus, the processor may require multiple receivers 130 for simultaneous operation from multiple controllers.

The transmitter provided in the controller can be infrared, or a low voltage frequency modulated transmitter. It will be appreciated by those skilled in the art that any low voltage transmitter is contemplated for use in the controller. Because the controller is wireless, a user can remove the controller from the location of the video game central processor. Thus, the controller is easily transported. In the preferred embodiment, the controller includes a non-volatile memory device 134 such as, but not limited to a static random access memory (SRAM), EEPROM, or Flash EPROM. The memory is used to store data, via control 136, corresponding to personal information regarding the user of the controller. Such personal information can include, but is not limited to, a user name, age, previous video game scores and statistics, and a current skill level for a video game. Additional information can be stored which is dependant upon the type of video games operated in the system. It will be appreciated that a controller of the present invention provides an advantage in allowing each child in a household to have a personalized controller. By including the age of a user, it will be appreciated that amusement games designed for a specific age group is not operated by an inappropriate user. Thus, operation of a video game can be prohibited based on the user age. Therefore, the controller provides a minimum level of supervision. Further, educational video "games" can be adjusted to the age of the user.

The central processing unit 122 can also contain a memory device 136 which stores data corresponding to the controllers. As such, another embodiment is contemplated. One embodiment transmits an identification code from the wireless controller 126 to the central processing unit 122 during operation. The CPU then analyzes the identification code using control 138 and retrieves data stored in the CPU memory 136 which corresponds to the identification code. The CPU can, therefore, retrieve personalized information relating to the user of the identified controller. For example, each child in a household can have a personalized controller which identifies the user and their game preferences (referred to herein as "video game operating preferences") and performance history (referred to herein as "historical game performance data" or "historical performance data"). As such, the game system uses one direction communication.

In another embodiment, the wireless controller stores the detailed personalized data in its memory 134 and transmits this data to the CPU. The CPU then stores this data in its memory 136 for use during the operation of a game. The controller, therefore, is the location for permanent storage of personalized user data. This embodiment requires that the CPU transmit updated information to the controller via transmitter 140 for updating the data stored in the controller memory. This updating is preferably performed during the operation of the game. This embodiment allows the controller to be used with multiple CPUs. For example, a child can transport their personal controller to another location (a friend's home) and use the controller on a different host CPU. In this embodiment, each controller 126 contains a receiver 142 for receiving wireless communications from a transmitter located in the processing unit. In this embodiment, the memory 136 located in the processor 122, therefore, can be volatile or non-volatile because the personalized data does not have to be stored beyond the operation of the game. Multiple transmitters 140 may be required to transmit to multiple controllers operating over different frequencies.

Several different methods of transmitting controller information from the wireless controller to the CPU are contemplated herein. In one embodiment, a multiple bit identification code is transmitted from the controller with each control signal output transmission. For example, in an eight-bit transmission from a controller, the first two-bits can designate the controller identification, see Table 1.

TABLE 1

| CODE | | SWITCH CODE | | | | | |
|---|---|---|---|---|---|---|---|
| 1 | 0 | 0 | 0 | 0 | 1 | 0 | 1 |

The data transmission illustrated in Table 1 uses two bits to transmit a controller ID code (CODE) and six bits to transmit a control switch code (SWITCH CODE). It will be appreciated by those skilled in the art, that other data formats can be implemented without departing from the present invention. In this embodiment, the CPU receives the data transmission and decodes the CODE to identify the transmitting controller. Data stored in the CPU memory can then be retrieved and used by the CPU during game operation.

If the controller is used to store detailed information about the user, an initial data transmission is performed by the controller to "down load" the data from the controller memory 134 to the CPU. The CPU then stores this data in memory 136 for use during game operations. This data is periodically updated by the CPU and transmitted to the controller during "quiet" periods in the game when the user is not operating the controller, such as between game levels. A final memory update can be performed upon completion of a particular game. Information stored in either the CPU or the controller can be updated via the CPU and selections presented on the video screen. For example, to enter a user name the CPU can present the alphabet on the screen and allow the user to select the letters of their name. Likewise, other personal information can be selected. As such, the CPU includes, or is capable of operating, software or firmware for the purpose of selecting user information.

Referring to FIG. 4, one exemplary embodiment of a wireless controller 126 is described. The controller includes a housing 150 which is designed to be hand held. A variety of input/control switches 152 are provided to allow an operator to respond and control an interactive video game. The number and style of input control switches is not particularly relevant to the present invention. The controller is preferably battery operated and has a receptacle for receiving a battery pack 154. The battery pack can be a rechargeable battery which can be recharged either separately, or while located within the controller. The controller includes circuitry described above for one or two directional communication of control signals and personal controller data with the CPU. The wireless controller can also include a battery saver circuit 156 which turns internal circuitry off, such as the transmitter, when a predetermined time elapses between activation of any of the control switches. This circuitry reduces power consumption, thereby, extending time between battery replacement or recharge.

Conclusion

A video game system has been described which includes a wireless game controller which stores information about the user of the controller. The controller includes a memory for storing the information. The information is then communicated through wireless transmissions to a processor operating the video game. The information can include, for example, the user's name, skill level, preferred characters, handicaps, limitations, and/or historical game scores. The game controllers can include a wireless receiver for receiving communications from the game processor to update information stored in the controller. Several different communication operations and protocols have been described, including storing a user identification code in the controller with corresponding detailed information stored in the game processor, or storing detailed information in the hand held controller and down loading the information to the game processor.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A video game system comprising:
   a processor unit for executing game instructions and displaying video images on a delay screen, the processor includes a receiver for receiving wireless identification and control signal transmissions; and
   a personalized portable control comprising:
      a plurality of control switches for generating game control signals;
      a non-volatile memory for storing personalized identification information corresponding to a user of the controller, the personalized identification information comprises a user age, and historical game performance data; and
      a transmitter for wireless transmitting of the personalized identification and game control signals to the processor unit, wherein the processor unit authorizes game execution based on the user age, further the processor unit comprises a transmitting for transmitting the historical game performance data to the portable controller.

2. The video game system of claim 1 wherein the processor unit further comprises a memory for storing user information corresponding to a plurality of possible users.

3. The video game system of claim 2 wherein the user information stored in the memory of the processor unit is retrieved for use by the processor unit in response to the identification signal transmitted by the personalized portable controller.

4. The video game system of claim 3 wherein the identification signal is transmitted from the personalized portable controller with a transmission of each control signal.

5. The video game system of claim 2 wherein the user information stored in the memory of the processor unit is down loaded from the personalized portable controller prior to the operation of a video game.

6. The video game system of claim 1 further comprising:
   a wireless transmitter located in the processor unit for transmitting updated information to the personalized portable controller; and
   a receiver located in the personalized portable controller for receiving the updated information for storage in the non-volatile memory of the personalized portable controller.

7. The video game system of claim 1 wherein the personalized portable controller includes a removable rechargeable battery park.

8. The video game system of claim 1 wherein the personalized portable controller includes power saver circuitry for reducing the power consumption of the controller when the controller is not in use.

9. A personalized portable video game controller comprising:
   a wireless transmitter for transmitting user personalized information and video game control signals to a video game processor, the personalized identification comprises a user age, and historical performance data;
   a plurality of input controls for generating the control signals in response to movements by a user;
   a non-volatile memory for storing the user personalized information; and
   a receiver for receiving wireless transmissions from the video game processor, the received wireless transmissions including performance data to be stored in the non-volatile memory.

10. The personalized portable video game controller of claim 9 wherein at least a portion of the user personalized information is transmitted to the video game processor with each control signal transmission.

11. The personalized portable video game controller of claim 9 wherein the user personalized information is selected from the group comprising user name, video game skill level, video game operating preferences, previous video game scores, or user age.

12. The personalized portable video game controller of claim 9 wherein the user personalized information is updated during video game operation via wireless transmissions from the video game processor.

13. The personalized portable video game controller of claim 9 wherein the user personalized information is transmitted from the controller to the game processor prior to interactive operation of a video game.

14. The personalized portable video game controller of claim 9 further comprising a removable rechargeable battery pack.

15. The personalized portable video game controller of claim 14 wherein the personalized portable controller includes power saver circuitry for reducing the power consumption of the controller when the controller is not in use.

16. A method of operating an interactive video system, the method comprising:
   activating a processing unit;
   transmitting personalized information from a controller using wireless transmissions, the personalized identification information comprising a user age, and historical performance data;
   storing the personalized information in a memory of the processing unit;
   authorizing operation of a video game based upon the user age;
   transmitting updated personalized information from the processing unit to the controller using wireless transmissions; and
   storing the updated personalized information in a memory of the controller.

17. The method of claim 16 wherein the personalized information is transmitted from the controller prior to interactive operation of a video game.

18. The method of claim 16 wherein the updated personalized information is transmitted during interactive operation of a video game.

19. A method of operating an interactive video game system comprising:

activating a game processing unit;

transmitting personalized information from a controller using wireless transmissions, the personalized identification information is stored in a memory of the controller and comprises a user age; and adjusting a video game based upon the user age.

* * * * *